United States Patent
Park (10) Patent No.: US 6,736,346 B1
(45) Date of Patent: May 18, 2004

(54) APPARATUS FOR WINDING CORD

(75) Inventor: Young-Kyu Park, Incheon (KR)

(73) Assignee: Myeongosung Tele-Electric Corp. (KR)

( * ) Notice: Subject to any disclaimer, the term of this patent is extended or adjusted under 35 U.S.C. 154(b) by 0 days.

(21) Appl. No.: 10/300,509

(22) Filed: Nov. 20, 2002

(51) Int. Cl.$^7$ .................. B65H 75/30; B65H 75/48
(52) U.S. Cl. .................. 242/378.1; 242/385.1
(58) Field of Search .................. 242/378.1, 378.2, 242/378.3, 385.1, 385.2, 385.3

(56) References Cited

U.S. PATENT DOCUMENTS

| | | | | |
|---|---|---|---|---|
| 1,958,626 A | * | 5/1934 | Krantz | 242/385.1 |
| 3,384,108 A | * | 5/1968 | Kern | 242/385.1 |
| 3,490,715 A | * | 1/1970 | Nicpon | 242/385.3 |
| 2002/0040945 A1 | * | 4/2002 | Stepancich et al. | 242/378.1 |

* cited by examiner

Primary Examiner—John M. Jillons
(74) Attorney, Agent, or Firm—Keusey, Tutunjian & Bitetto, P.C.

(57) ABSTRACT

There is disclosed an apparatus for winding a cord, and more particularly, an apparatus for winding a cord, in which a winding operation and a wind stopping operation are performed by pulling the cord of an ear-microphone of a portable cordless telephone. The cord winding and the wind stopping operations can be performed by a cord pulling operation without a separate operation of a release button, thereby providing convenience to the user. Further, while the ball is moved along the guide grooves, the winding and stopping operations are performed. Therefore, the ball functions as a moving bearing upon a rotation operation of the bobbin so that the bobbin is facilely rotated, thereby preventing an erroneous operation of the apparatus.

9 Claims, 6 Drawing Sheets

APPARATUS FOR WINDING CORD

BACKGROUND OF THE INVENTION

1. Field of the Invention

The present invention relates to an apparatus for winding a cord, and more particularly, to an apparatus for winding a cord, in which a winding operation and a wind stopping operation are performed by pulling the cord of an ear-microphone of a portable cordless telephone, etc.

2. Description of the Related Art

Hands-free ear microphones are increasingly used due to the spread of portable cordless telephone usage. The hands-free ear microphone includes a cord, a plug connected to one end of the cord, and an earphone and a microphone connected to other end of the cord. When using the hands-free ear microphone, the plug is inserted into an earphone jack of the portable cordless telephone. The earphone is generally worn by insertion in an ear channel. If the portable cordless telephone is used while being carried on user's belt or in a pocket, the cord is extended long enough from the ear to the belt or the pocket. The extended cord length requires caution to avoid entanglement with the user, may be uncomfortable and may affect the user's behavior. Further, if the cord is caught by a protrusion, etc., the user may be inconvenienced or burdened by the cord's presence.

If the portable cordless telephone is not used, the ear microphone is bunched up and stowed, e.g., in a pocket, etc. Then, when taking out the ear microphone from the pocket to use it again, since the cord is twisted or entangled, the user needs to untangle the cord, thereby causing inconvenience or even damage to the device.

Therefore, an apparatus for arranging and storing the cord is needed. Typically, cord winding apparatuses in which the cord is wound on a bobbin or a reel using restoring force of a spiral spring have been disclosed, where the cord is drawn out when in use.

In Korean laid-open publication No.200-63791, there is disclosed "a side open type bi-directional earphone cord winding apparatus".

The conventional apparatus includes a side-opened winding case and a bobbin. A guide groove is formed in an inner side surface of the winding case and an outer side surface of a bottom portion of the bobbin, which is contacted with the inner side surface of the winding case. A ball is inserted into a space formed by the guide grooves so as to stop rotation of the bobbin, which would be caused by the spring, or to release the stopping operation while being moved along the guide groove in combination with an operation of drawing the cord out of the bobbin or winding the cord on the bobbin using the spring.

In the conventional apparatus, the spiral guide groove is formed in the outer side surface of the bottom portion of the bobbin. And, the guide groove corresponding to the spiral guide groove is formed in the inner side surface of the winding case, which is contacted with the outer side surface of the bottom portion of the bobbin. The ball is moved along the spiral guide grooves so as to perform the stopping operation and the releasing operation.

In the stopping operation, the ball is positioned at a stopping groove formed in the spiral guide groove so as to stop the rotation of the bobbin, thereby performing the stopping operation.

In the releasing operation, the ball positioned at the stopping groove is deviated from the stopping state to the releasing state by rotating the bobbin in an opposite direction. In this situation, the bobbin can be freely rotated in one direction.

However, in the conventional apparatus, since the ball is moved in only a radial direction along the guide groove but stopped in a circumferential direction, and the spiral guide groove formed in the bobbin is rotated, the ball cannot be easily moved. Therefore, there is a high likelihood that a malfunction can occur, so that the stopping and releasing operations cannot be precisely performed.

SUMMARY OF THE INVENTION

The present invention provides an apparatus for winding a cord, in which a ball is moved along a circular guide groove, thereby precisely performing stopping and releasing operations without the risk of malfunction.

The present invention provides an apparatus for winding a cord. The apparatus comprises: a winding case including a first plate in which one end of a fixing shaft is supported at a center portion, a second plate in which the other end of the fixing shaft is supported at a center portion and a first guide groove is formed in an inner surface, a first sidewall formed between one ends of the first and second plates and having a first through hole, and a second sidewall formed between the other ends of the first and second plates to be opposite to the first sidewall and having a second through hole; a cup-shaped bobbin of which a shaft hole is rotatably inserted onto the fixing shaft between the first and second plates and which has a second guide groove radially extended from the shaft hole on an outer surface of a bottom surface contacted with an inner surface of the second plate; a ball inserted into a space formed by the first and second guide grooves so as to be moved along the first guide groove according to a rotational direction of the bobbin; a spiral spring which is disposed at an inside portion of the bobbin and of which one end is fixed to the fixing shaft and the other end is mounted on a sidewall of the bobbin so as to provide rotational force to the bobbin in one direction; and a cord of which a middle portion is fixed to the bobbin, and extended portions extended from the middle portion toward which both sides are wound on an outer surface of the bobbin by the rotational force of the spiral spring, and in which one of the extended portions is extended through the first through hole of the first sidewall to an outside of the winding case, and the other is extended through the second through hole of the second sidewall to the outside of the winding case.

BRIEF DESCRIPTION OF THE DRAWINGS

The above objects and other advantages of the present invention will become more apparent by describing in detail preferred embodiments thereof with reference to the attached drawings in which:

FIGS. 5a to 5e are views showing operations of the apparatus according to the present invention.

DETAILED DESCRIPTION OF THE PREFERRED EMBODIMENTS

Now, preferred embodiments of the present invention will be described in detail with reference to the annexed drawings.

Figure 1:
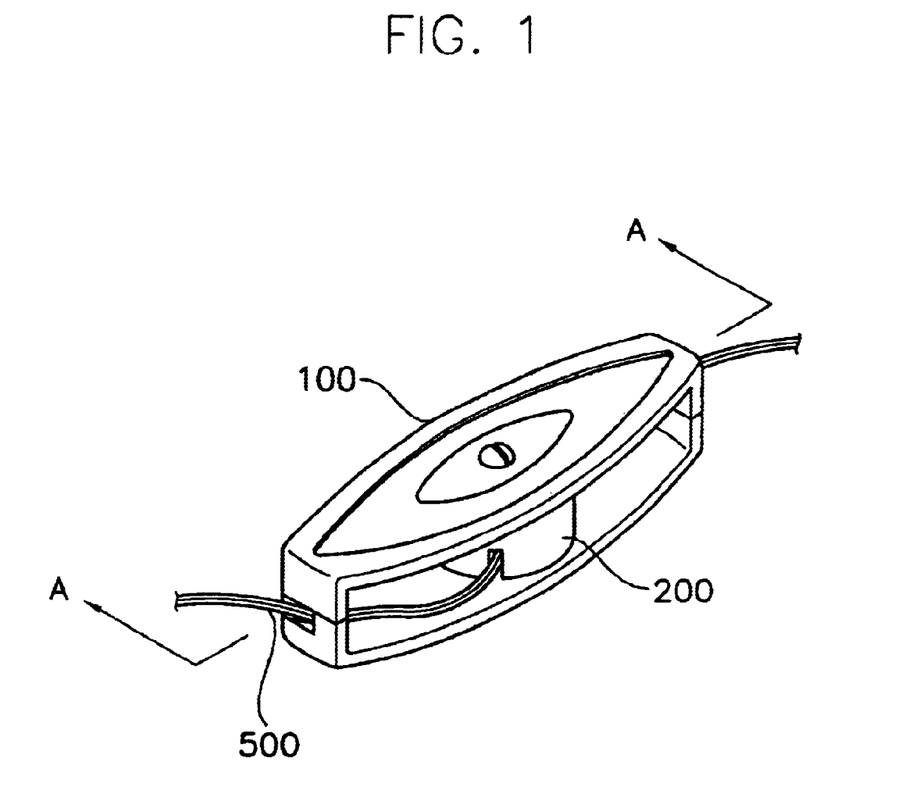
FIG. 1 is a perspective view of an apparatus for winding a cord according to an embodiment of the present invention.
Figure 2:
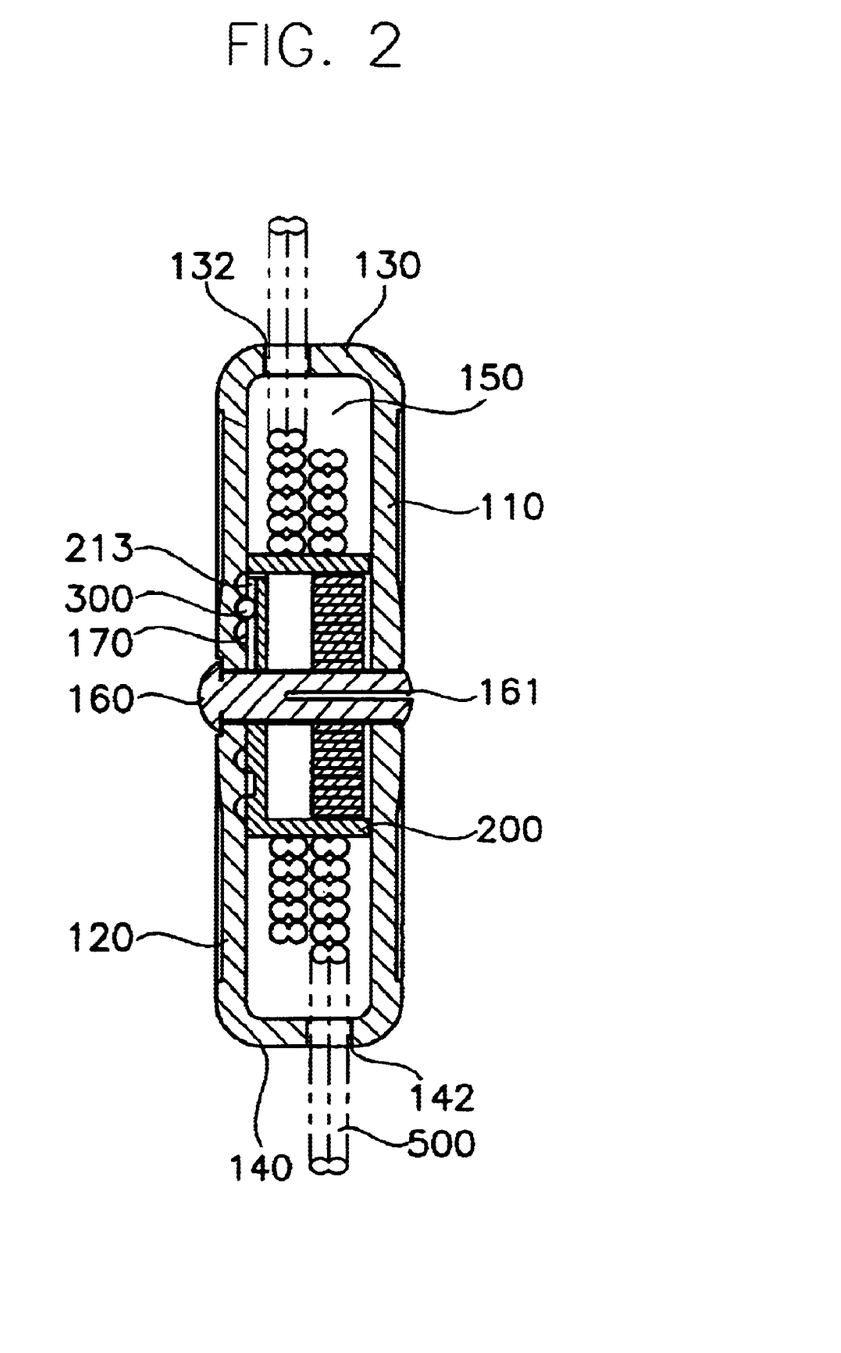
FIG. 2 is a cross-sectional view taken along the line A–A' of FIG. 1.
Figure 3:
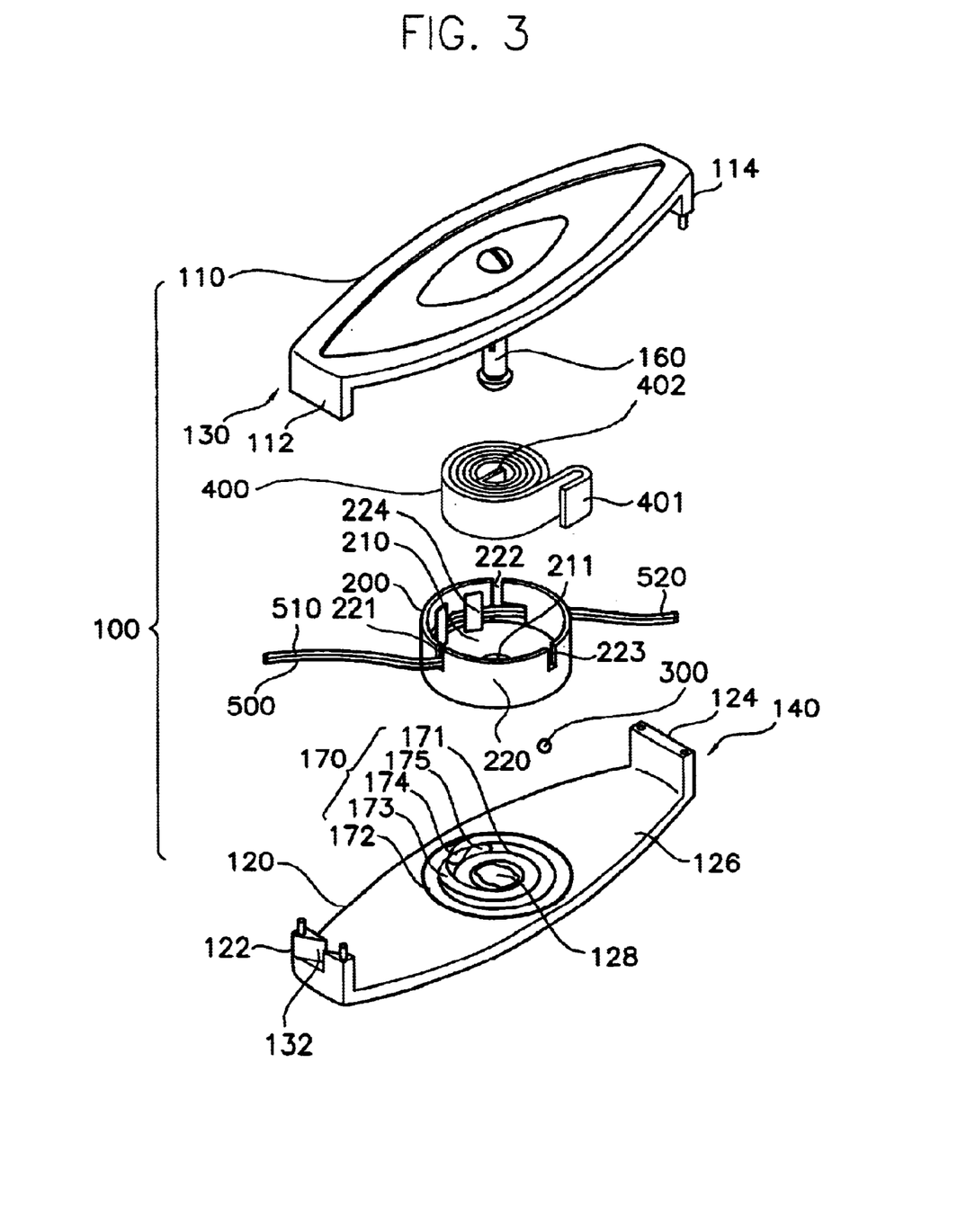
FIG. 3 is an exploded perspective view of the apparatus of FIG. 1.

FIG. 1 is a perspective view of an apparatus for winding a cord according to an embodiment of the present invention, FIG. 2 is a cross-sectional view taken along the line A–A' of FIG. 1, and FIG. 3 is an exploded perspective view of the apparatus of FIG. 1.

An apparatus for winding a cord according to the present invention is comprised of a winding case 100, a cup-shaped bobbin 200, a ball 300, a spiral spring 400 and a cord 500.

The winding case 100 includes first and second plates 110 and 120 opposite to each other, and first and second sidewalls 130 and 140 opposite to each other. The first and second plates 110 and 120 respectively preferably have an elliptical shape. The first and second sidewalls 130 and 140 are positioned at each end of the first and second plates 110 and 120. Therefore, a space portion 150 is defined by the first and second plates 110 and 120 and the first and second sidewalls 130 and 140.

One end of a fixing shaft 160 crossing the space portion 150 and extended toward the second plate 120 is supported at a center portion of the first plate 110.

The other end of the fixing shaft 160 is supported at a center portion of the second plate 120.

The first sidewall 130 is defined by extended portions 112 and 122, which are opposite to each other and extend from ends of the first and second plates 110 and 120. At the extended portion 122, there is formed a first through hole 132. The first through hole 132 is preferably formed to be inclined in a direction along which one end of the cord 500 is wound.

The second sidewall 140 is defined by extended portions 114 and 124, which are opposite to each other and extended from the other ends of the first and second plates 110 and 120. At the extended portion 114, there is formed a second through hole 142. The second through hole 142 is formed to be inclined in a direction along which the other end of the cord 500 is wound.

At a center portion of an inner side surface 126 of the second plate 120, there is formed a shaft hole 128 in which the other end of the fixing shaft 160 is inserted.

A first guide groove 170 is formed around the shaft hole 128 in an inner surface of the second plate 120.

The first guide groove 170 includes an internal circular groove 171, an external circular groove 172, a spiral groove 173, a first stopping groove 174 and a second stopping groove 175. The spiral groove 173, and stopping grooves 174 and 175 function as parts of a transition mechanism for the ball 300 to permit release or to stop bobbin rotation.

The internal circular groove 171 has the fixing shaft 160 in its center, and functions to guide the ball 300 along an inner portion of the groove 171 in a counterclockwise direction, i.e., in a direction along which the cord 500 is wound on the bobbin 200 by restoring force of the spiral spring 400, when the bobbin 200 is rotated, in the case shown, in the counterclockwise direction.

The external circular groove 172 is formed at an outer circumference of the internal circular groove 171 with the fixing shaft 160 in the center, and functions to guide the ball 300 along an inner portion of the groove 172 in a clockwise direction, i.e., in a direction along which the cord 500 is pulled out of the bobbin 200 by pulling force exerted on the cord 500, when the bobbin 200 is rotated, in the case shown, in the clockwise direction.

The spiral groove 173 is positioned between the internal circular groove 171 and the external circular groove 172, and functions to guide the ball 300 positioned at the internal circular groove 171 to the external circular groove 172, when the bobbin 200 is rotated in the clockwise direction.

In order to prevent the ball 300, which was guided from the internal circular groove 171 to the spiral groove 173, from being moved to the internal circular groove 171 again, when the bobbin 200 is rotated in the clockwise direction, in the internal circular groove 171 is formed a threshold or transitioning surface so as to cross the internal circular groove 171 along a sidewall of the spiral groove 173.

In order to prevent the ball 300 from being moved from the external circular groove 172 to the spiral groove 173 again, when the bobbin 200 is rotated in the counterclockwise direction, in the spiral groove 173 is formed the threshold so as to cross the spiral groove 173 along a sidewall of the external circular groove 172.

The first stopping groove 174 is positioned between the internal circular groove 171 and the external circular groove 172. The first stopping groove 174 functions to stop the ball 300 guided from the external circular groove 172, thereby preventing the bobbin 200 from being rotated further.

In order to allow the ball 300 to be moved along external circular groove 172 when the bobbin 200 is rotated in the clockwise direction and to guide the ball 300 to the first stopping groove 174 when the bobbin 200 is rotated in the counterclockwise direction, a threshold is formed in the external circular groove 172 so as to cross the external circular groove 172. Furthermore, in order to prevent the ball 300 guided in the first stopping groove 174 from being moved to the external circular groove 172 again, when the bobbin 200 is rotated in the clockwise direction, a threshold is formed in the first stopping groove 174.

The second stopping groove 175 is positioned between the internal circular groove 171 and the external circular groove 172. The second stopping groove 175 has a desired depth so that the ball 300 moved from the first stopping groove 174 is stopped and, at the same time, the bobbin 200 can get over the ball 300 and be successively rotated, when the bobbin 200 is rotated in the counterclockwise direction. In addition, the second stopping groove 175 guides the ball 300 to the internal circular groove 171, when the bobbin 200 is rotated in the counterclockwise direction.

In order to allow the ball 300 to be held in the second stopping groove 175 when the bobbin 200 is rotated in the clockwise direction, and to allow the ball 300 to be guided to the internal circular groove 171 when the bobbin 200 is rotated in the counterclockwise direction, the threshold is formed in the first stopping groove 174 so as to cross the first stopping groove 174. Further, in order to prevent the ball 300 guided to the internal circular groove 171 from being guided to the second stopping groove 175 again when the bobbin 200 is rotated in the clockwise direction, the threshold is formed to be crossed between the second stopping groove 175 and the internal circular groove 171.

Therefore, if the direction of the ball 300 is repeatedly transformed in the counterclockwise direction and the clockwise direction, the ball 300 is guided, in turn, to the internal circular groove 171, the spiral groove 173, the external circular groove 172, the first stopping groove 174, the second stopping groove 175 and the internal circular groove 171, so that stopping and releasing states are repeatedly employed. The thresholds formed among the grooves prevent the ball 300 from being inversely guided.

The bobbin 200 preferably has a cup shape including a circular bottom plate 210 and a cylindrical sidewall 220, which is vertically extended from an edge of the bottom plate 210.

A shaft hole 211 is formed at a center portion of the bottom plate 210. Three cut-away portions 221, 222, and 223 extend downward from an entrance of the cup shape in the sidewall at regular intervals.

The cut-away portion 221 is cut away from the entrance of the sidewall up to only about half the height thereof. The cut-away portion 222 is cut away up to a bottom portion of the sidewall and has a communicating hole 224 extended along the sidewall between the bottom portion and the half height of the sidewall.

Therefore, a middle portion of the cord 500 is inserted into the bobbin 200, so that a first extended portion 510 of the cord 500 is withdrawn through the cut-away portion 221 to outside of the bobbin 200 and a second extended portion 520 is withdrawn through the communicating hole 224 to the outside of the bobbin 200.

Therefore, the first extended portion 510 of the cord 500 is wound on an upper circumferential portion of the sidewall of the bobbin 200, and the second extended portion 520 of the cord 500 is wound on a lower circumferential portion of the sidewall of the bobbin 200. Thus, the first and second extended portions 510 and 520 are wound in parallel with each other in the same direction.

One end of the spiral spring 400 is supported by the cut-away portion 223, and the other end is supported by a slit 161 of the fixing shaft 160. The spiral spring 400 is disposed at an inner portion of the bobbin 200. Therefore, if a user pulls the cord 500, the bobbin 200 is rotated in a direction along which the spiral spring 400 is wound. Thus, the bobbin 200 always receives rotational force in a direction in which the spiral spring 400 is released.

A second guide groove 213 is formed at an outer surface 212 of the bottom plate 210 of the bobbin 200.

In order to push the ball 300 along the first guide groove 170 when rotating the bobbin 200 in a direction along which the cord 500 is wound, one sidewall 2131 in the second guide groove 213 is formed to have almost vertical shape. In case the ball 300 is positioned at the second stopping groove 175 when the bobbin is rotated in a direction along which the cord 500 is released, the other sidewall 2132 in the second guide groove 213 has a desired inclined angle so that the ball 300 can go over the sidewall.

In addition, in the bottom plate 210, there is formed a slit 214 extended along the second guide groove 213 from the shaft hole 211 and extended along the sidewall 220 in the form of an arc in the neighborhood of the sidewall 220. The second guide groove 213 is positioned at a free end of an elastic portion 215 restricted by the slit 214 so as to provide elastic force to the ball 300 when the ball 300 goes over the inclined sidewall 2132 of the second guide groove 213.

Figure 4:
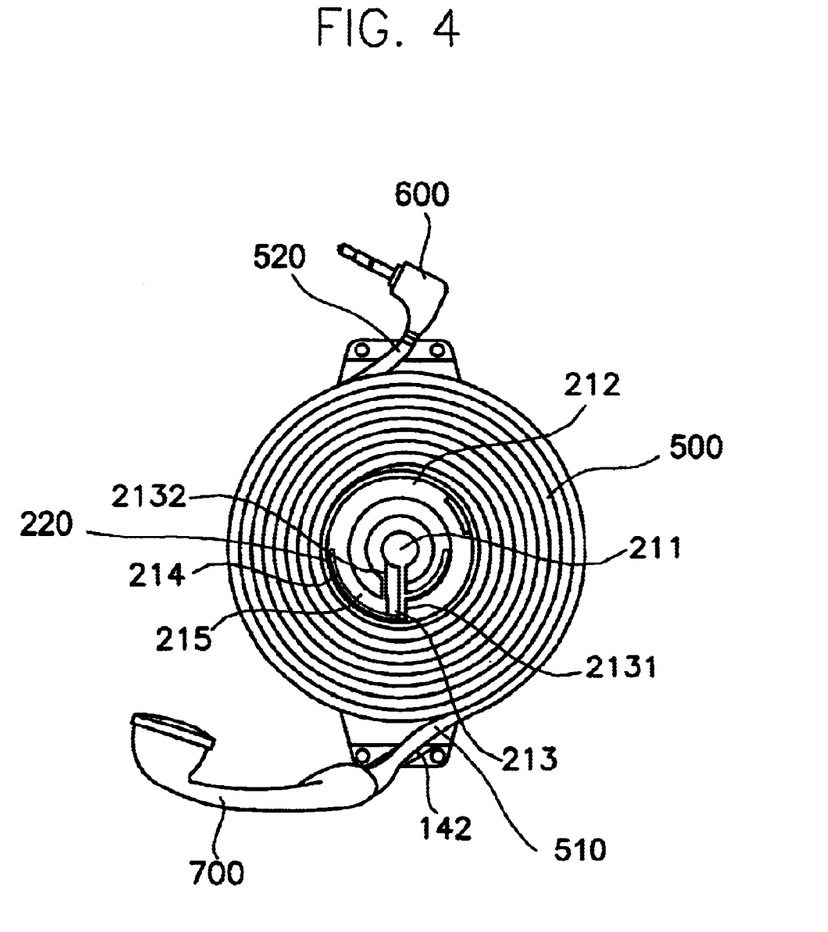
FIG. 4 is a schematic view showing an earphone cord wound by the apparatus according to the present invention.

FIG. 4 shows a state where an earphone cord is wound on the apparatus of the present invention. As shown in FIG. 4, the first and second extended portions 510 and 520 of the cord 500 are wound on one bobbin 200 in parallel with each other in the same direction, on the basis of the middle portion of the cord 500. An end of the first extended portion 510 is connected to an earphone 700, and an end of the second extended portion 520 is connected to a plug 600. It is to be understood the present invention illustratively shows the use of an ear phone cord; however any cord winding application can benefit by the use of the present invention.

Figure 5A:
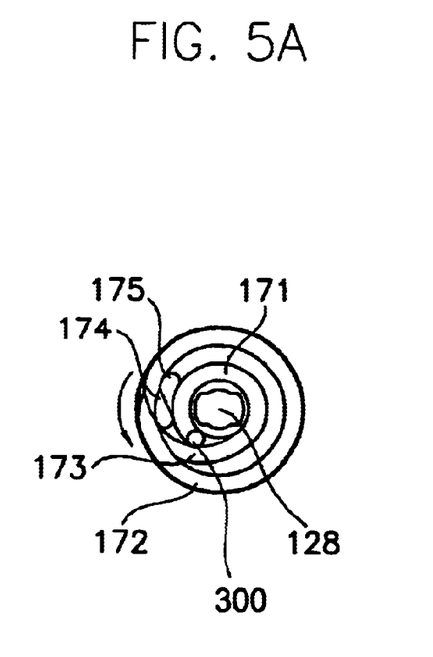

Referring to FIGS. 5a–e and initially to FIG. 5a, in a state that the cord 500 is completely wound as shown in FIG. 4, the ball 300 is positioned in the internal circular groove 171.

Figure 5B:
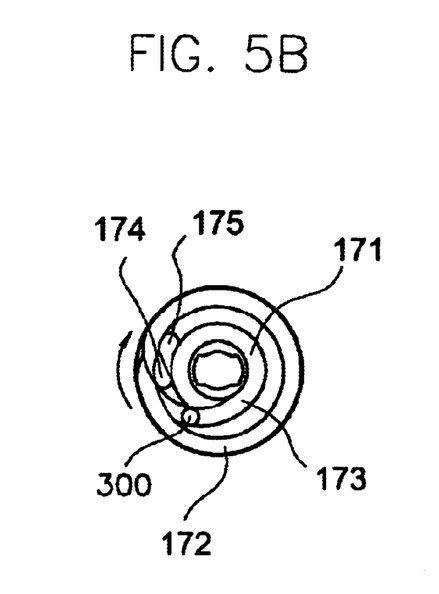

Referring to FIG. 5b, if the user pulls both ends of the cord 500, the ball 300 is moved from the internal circular groove 171 through the spiral groove 173 to the external circular groove 172.

If the user pulls the cord 500 in succession, the ball 300 is moved along the external circular groove 172.

Figure 5C:
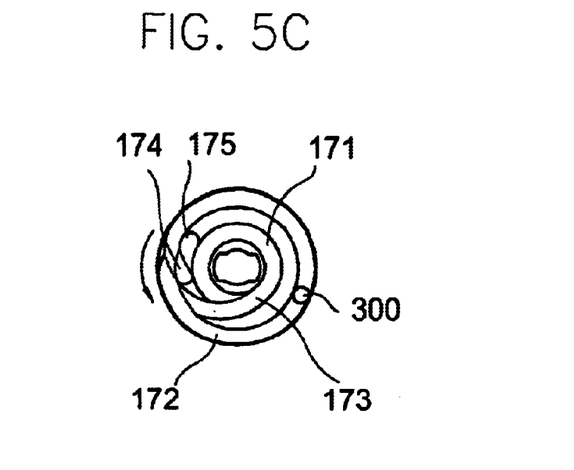
Figure 5D:
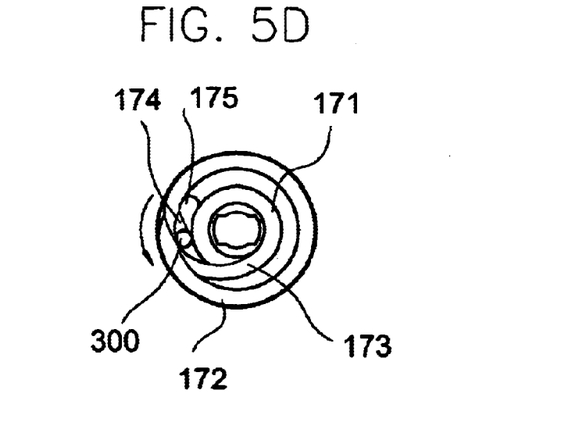

Referring to FIG. 5c, if the user stops the pulling operation, since the bobbin 200 is inversely rotated by the restoring force of the spiral spring 400, the ball 300 is inversely moved along the external circular groove 172. However, as shown in FIG. 5d, the ball 300 cannot go over the threshold of the external circular groove 172, and then the ball 300 is guided to the first stopping groove 174. Since the ball 300 is stopped in the first stopping groove 174, the rotation of the bobbin 200 is stopped.

Therefore, the released cord 500 is not wound anymore to maintain the released state.

Figure 5E:
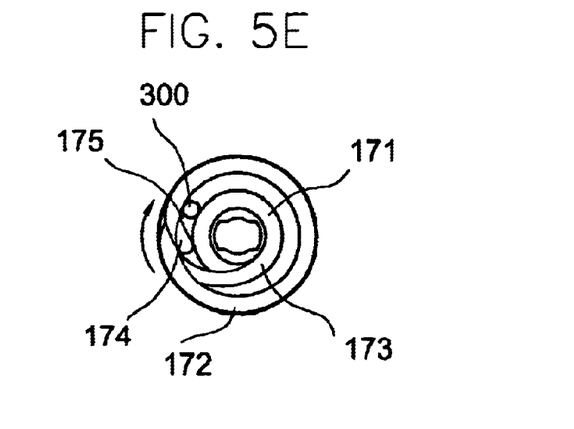

In this stopping state, if the user slightly pulls and releases the cord 500 again, the ball 300 is deviated from the first stopping groove 174 due to the pulling operation so as to be guided to the second stopping groove 175 and thus to release the stopping state, as shown in FIG. 5e.

Then, the bobbin 200 is inversely rotated by the restoring force of the spiral spring 400. As shown in FIG. 5a, the ball 300 is guided from the second stopping groove 175 to the internal circular groove 171 so as to be moved along the internal circular groove 171, thereby winding the cord 500 on the bobbin 200.

According to the apparatus, as described above, the cord winding and the wind stopping operations can be performed by a cord pulling operation without a separate operation of a release button, thereby providing convenience to the user.

Further, while the ball is moved along the guide grooves, the winding and stopping operations are performed. Therefore, the ball functions as a moving bearing upon a rotation operation of the bobbin so that the bobbin is facilely rotated, thereby preventing an erroneous operation of the apparatus.

While the present invention has been described in detail, it should be understood that various changes, substitutions and alterations can be made hereto without departing from the spirit and scope of the invention as defined by the appended claims.

What is claimed is:

1. An apparatus for winding a cord, comprising:
   a bobbin for storing cord, the bobbin having a bottom and a sidewall extending from the bottom, the bottom including an exterior surface;
   a plate which secures the bobbin and permits a biased rotation of the bobbin relative to the plate, the plate having a first surface facing the exterior surface of the bobbin, the first surface and the exterior surface forming channels which permit movement of a ball in accordance with the rotation of the bobbin; the channels including:
   an internal circular groove for guiding the ball in a direction along which the cord is wound when the bobbin is rotated to wind the cord;
   an external circular groove for guiding the ball in a direction along which the cord is released when the bobbin is rotated to release the cord; and
   a transition mechanism, which permits the ball to move between the internal circular groove and the external circular groove when the bobbin motion is changed.

2. The apparatus of claim 1, wherein the bobbin is biased by a spiral spring which is disposed at an inside portion of the bobbin and of which one end is fixed relative to the plate and the other end is mounted on a sidewall of the bobbin so as to provide rotational force to the bobbin in one direction.

3. The apparatus of claim 2, wherein the cord includes a middle portion, which is secured to the bobbin, and extended portions extended from the middle portion toward both sides, which are wound on an outer surface of the sidewall of the bobbin by a rotational force of the spiral spring.

4. The apparatus of claim 3, further comprising a winding case which includes the plate wherein one of the extended portions is extended through a first through hole of a first sidewall to an outside of the winding case, and the other is extended through a second through hole of the second sidewall to the outside of the winding case.

5. The apparatus of claim 1, wherein the transition mechanism includes:

a spiral groove for guiding the ball from the internal circular groove to the external circular groove when the bobbin is rotated to release the cord, which is positioned between the internal circular groove and the external circular groove.

6. The apparatus of claim 1, wherein the transition mechanism includes:

a first stopping groove which is positioned between the internal circular groove and the external circular groove so as to stop the ball guided from the external circular groove, when the bobbin is rotated to wind the cord, and to stop the bobbin to resist further rotation thereof.

7. The apparatus of claim 6, wherein the transition mechanism includes:

a second stopping groove which is positioned between the internal circular groove and the external circular groove, and has a depth which stops the ball guided from the first stopping groove, when the bobbin is rotated to release the cord, and permits the ball to move to permit the bobbin to be successively rotated.

8. The apparatus of claim 7, wherein the exterior surface of the bobbin includes a guide groove which has a first sidewall vertically formed so as to push the ball along the channels when the bobbin is rotated in the direction along which the cord is wound, and a second sidewall in the guide groove which has an inclined angle so that the ball can go over the second sidewall, if the ball is positioned at the second stopping groove when the bobbin is rotated in the direction along which the cord is released.

9. The apparatus of claim 8, wherein a slit is extended along the guide groove in the form of an arc in the bottom of the bobbin, and the guide groove is positioned at a free end of an elastic portion restricted by the slit so as to provide elastic force to the ball when the ball goes over the second sidewall of the guide groove.

* * * * *